United States Patent
Dukich et al.

(10) Patent No.: US 7,661,312 B2
(45) Date of Patent: Feb. 16, 2010

(54) METHODS AND SYSTEMS FOR SEGREGATING SENSORS WITHIN A HOUSING

(75) Inventors: Peter J. Dukich, Blaine, MN (US);
Gregory A. Miller, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 137 days.

(21) Appl. No.: 11/427,937

(22) Filed: Jun. 30, 2006

(65) Prior Publication Data

US 2008/0000294 A1      Jan. 3, 2008

(51) Int. Cl.
    *G01P 1/02* (2006.01)
(52) U.S. Cl. ..................................... 73/493
(58) Field of Classification Search .......... 73/493; 123/319; 361/735; 439/49
    See application file for complete search history.

(56) References Cited

U.S. PATENT DOCUMENTS

| | | | |
|---|---|---|---|
| 4,336,718 A | | 6/1982 | Washburn |
| 4,620,442 A | | 11/1986 | MacGugan et al. |
| 4,975,084 A | * | 12/1990 | Fedder et al. ............ 439/608 |
| 5,085,079 A | * | 2/1992 | Holdren et al. .......... 73/514.23 |
| 5,136,998 A | | 8/1992 | Deutsch |
| 5,442,560 A | | 8/1995 | Kau |
| 5,495,414 A | * | 2/1996 | Spangler et al. ............ 701/45 |
| 5,745,347 A | | 4/1998 | Miller et al. |
| 5,803,213 A | | 9/1998 | Davis et al. |
| 5,890,569 A | | 4/1999 | Goepfert |
| 5,892,152 A | | 4/1999 | Darling et al. |
| 5,918,865 A | | 7/1999 | Osterberg |
| 6,498,996 B1 | | 12/2002 | Vallot |
| 6,557,415 B2 | | 5/2003 | Stewart et al. |
| 6,578,420 B1 | | 6/2003 | Hsu |
| 6,578,682 B2 | | 6/2003 | Braman et al. |
| 6,778,924 B2 | | 8/2004 | Hanse |
| 6,843,126 B2 | | 1/2005 | Hulsing, II |
| 2004/0200279 A1 | | 10/2004 | Mitani et al. |
| 2006/0042381 A1 | * | 3/2006 | Still ........................ 73/493 |

FOREIGN PATENT DOCUMENTS

| | | |
|---|---|---|
| EP | 0542436 | 10/1992 |
| EP | 0908363 | 4/1999 |
| EP | 1630561 | 3/2006 |

OTHER PUBLICATIONS

A. Mason, N. Yazdi, J. Zhang, and Z. Sainudeen, "A Modular Sensor Microsystem Utilizing a Universal Interface Circuit", IEEE Int. Symposium on Circ. and Systems (ISCAS), Bangkok Thailand, May 2003, 4 pages.

http://www.rel-tek.com/Dxcaliber.htm;"DXCALIBAR Field Monitoring Remote Calibration and Barrier Box (Product 4.512x)", 2005 Rel-Tek Corporation, 4 pages.

European Patent Office, "European Search Report", Feb. 25, 2009, Published in: EP.

* cited by examiner

*Primary Examiner*—Hezron Williams
*Assistant Examiner*—Mark Shabman
(74) *Attorney, Agent, or Firm*—Fogg & Powers LLC

(57) ABSTRACT

An inertial measurement unit is described that includes a first subassembly comprising one or more inertial sensors, a second subassembly comprising support electronics for the one or more inertial sensors, and at least one pair of mating connectors configured to provide an interface between the first subassembly and the second subassembly.

4 Claims, 10 Drawing Sheets

METHODS AND SYSTEMS FOR SEGREGATING SENSORS WITHIN A HOUSING

STATEMENT REGARDING FEDERALLY SPONSORED RESEARCH & DEVELOPMENT

The United States Government has acquired certain rights in this invention pursuant to Contract No. DAAH01-03-C-R314 issued by the Department of the Army.

BACKGROUND OF THE INVENTION

This invention relates generally to packaging of sensor devices, and more specifically, to methods and systems for segregating sensors within a housing.

Typically, the supporting electronics for sensor devices are intermingled with the sensor devices within a housing. Such sensor devices, for example, gyroscopes, accelerometers and the like, require an extensive, both in time and cost, calibration process. When there is a failure in the supporting electronics, these sensor devices may be disturbed during the removal and replacement process of the failed electronic component(s). Such a disturbance often results in the need to recalibrate the sensor devices.

Sensor devices and supporting electronics have often been intermingled in order to keep a size of a housing incorporating both within one or more specified dimensions. However, the sizes of supporting electronics are continually being reduced with, for example, multiple discrete components being included into programmable logic devices and the like. The size reduction associated along with other factors have made it possible to consider reconfiguration of the packaging for such sensor based devices.

BRIEF DESCRIPTION OF THE INVENTION

In one aspect, an inertial measurement unit is provided that comprises a first subassembly comprising one or more inertial sensors, a second subassembly comprising support electronics for the one or more inertial sensors, and at least one pair of mating connectors configured to provide an interface between the first subassembly and the second subassembly.

In another aspect, a method for fabricating an inertial measurement unit is provided. The method comprises providing a first subassembly having one or more inertial sensors mounted therein, providing a second subassembly including support electronics therein for the one or more inertial sensors, and interconnecting the first subassembly and the second subassembly to form a housing for the inertial measurement unit.

DETAILED DESCRIPTION OF THE INVENTION

Figure 1:
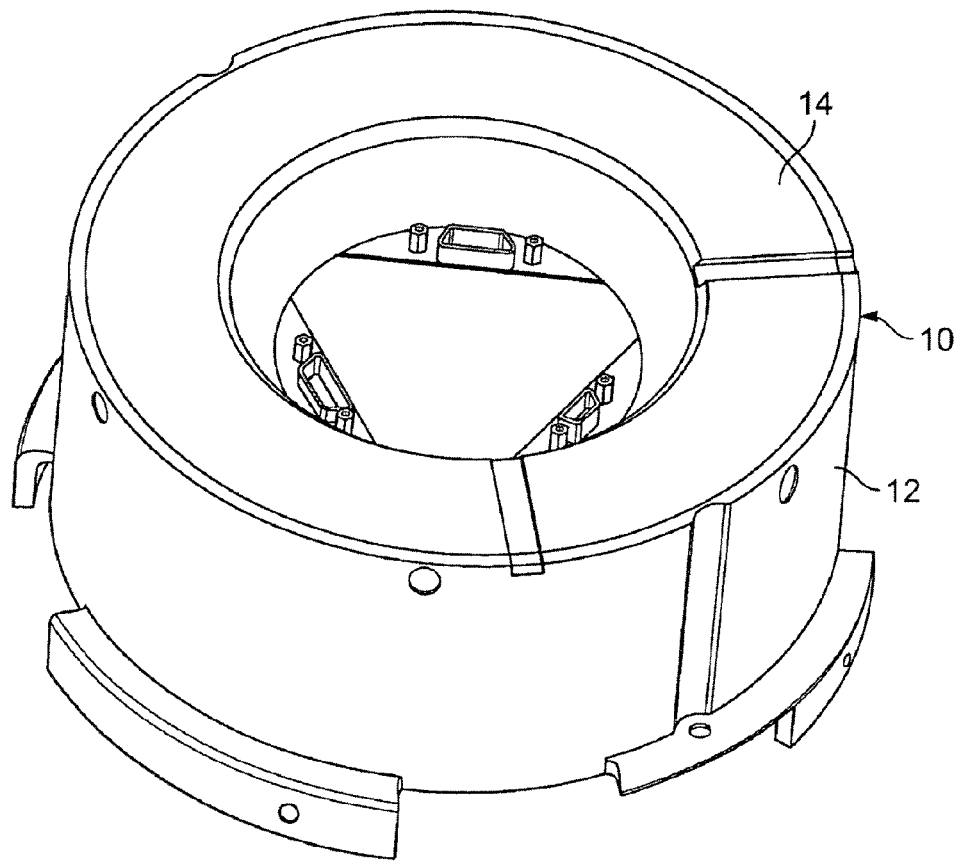
FIG. 1 is an illustration of an assembled inertial measurement unit (IMU).

FIG. 1 is an illustration of a known assembled inertial measurement unit (IMU) 10. As further described below with respect to FIGS. 2-4, IMU 10 includes both a gyroscope, accelerometer, and support electronics subassembly 12 and a power supply subassembly 14.

Figure 2:
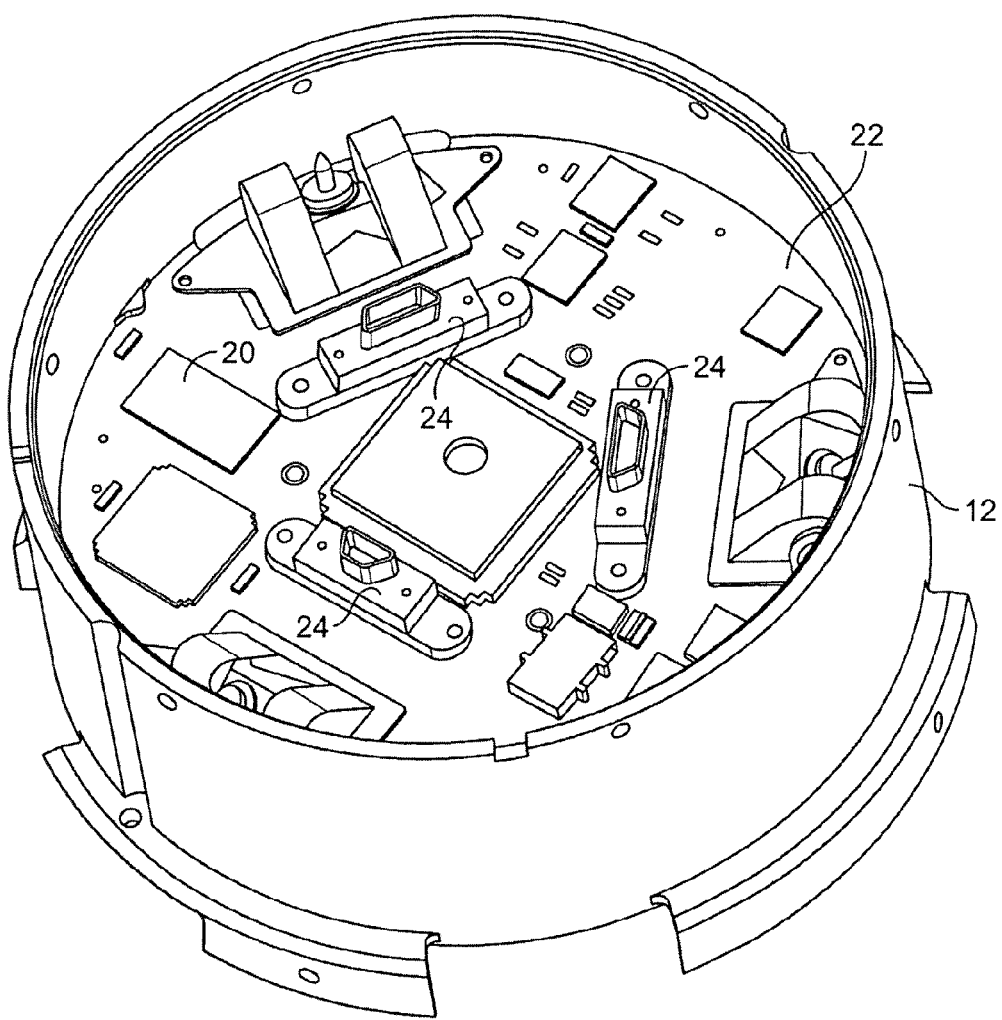
FIG. 2 is an illustration of a gyroscope, accelerometer, and support electronics subassembly of the IMU of FIG. 1.

FIG. 2 is an illustration of gyroscope, accelerometer, and support electronics subassembly 12 of IMU 10. As seen in FIG. 2, gyroscope, accelerometer, and support electronics subassembly 12 includes multiple electronic components 20 mounted on a circuit board 22 which are hard wired to the gyroscopes and accelerometers which are mounted beneath circuit board 22. A plurality of connectors 24 are also mounted on circuit board 22 which provide an interface to external power sources and further provide an interface to external systems that receive the inertial data that is output from IMU 10. Additionally, connectors 24 also provide an interface for reprogramming and calibration of a processing device which is also mounted on circuit board 22.

Figure 3:
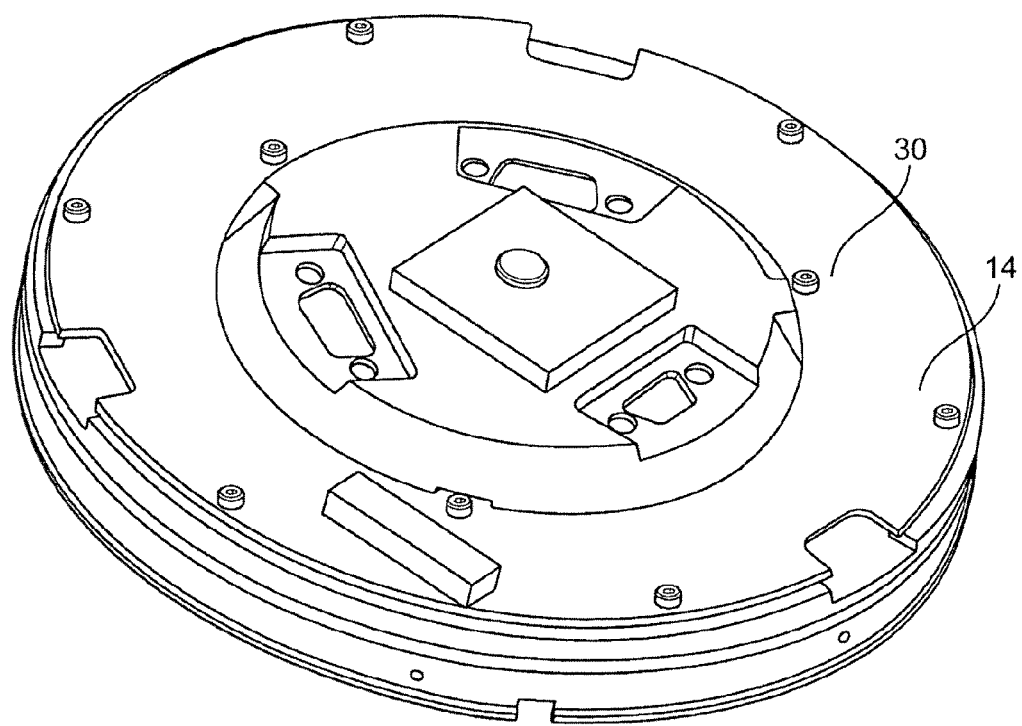
FIG. 3 is an illustration of a power supply subassembly of the IMU of FIG. 1.

FIG. 3 is an illustration of power supply subassembly 14 of IMU 10 of FIG. 1. Referring again to FIG. 1, it is apparent that FIG. 3 illustrates an underside 30 of power supply subassembly 14, and that power supply subassembly 14 includes openings 32 that allow power supply subassembly 14 to be placed onto gyroscope, accelerometer, and support electronics subassembly 12. In this configuration, connectors 24 extend through openings 32 of power supply subassembly 14.

Figure 4:
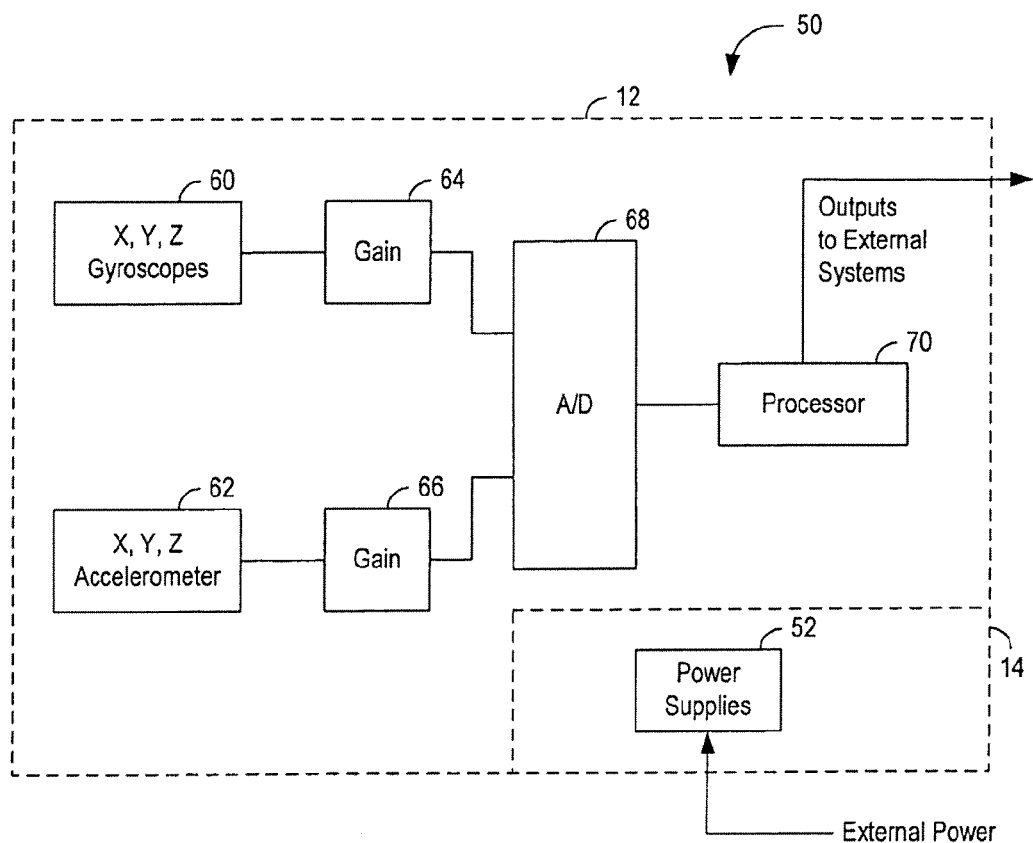
FIG. 4 is a block diagram of the IMU of FIG. 1, depicting boundaries between the subassemblies of FIGS. 2 and 3.

FIG. 4 is a block diagram 50 of IMU 10 (shown in FIG. 1). Block diagram 50 illustrates functional boundaries between gyroscope, accelerometer, and support electronics subassembly 12 and power supply subassembly 14 respectively illustrated in FIGS. 2 and 3. Power supply subassembly 14 include a power supply 52 which receives power from an external source and converts the received power to levels needed for operation of the various components of gyroscope, accelerometer, and support electronics subassembly 12.

Gyroscope, accelerometer, and support electronics subassembly 12 includes three gyroscopes 60, associated with the three axes, X, Y, and Z, and three accelerometers 62, also associated with the three axes. Outputs from gyroscopes 60 and accelerometers 62 are typically amplified utilizing respective gain components 64 and 66 whose outputs are input into A/D converter 68. An output of A/D converter 68 is then provided to a processing device 70, which is programmed to output data to external systems that is representative of the inertial conditions experienced by gyroscopes 60 and accelerometers 62.

While gyroscope, accelerometer, and support electronics subassembly 12 is illustrated as having the five major components described above, those skilled in the art will realize that many additional electronic components are utilized in the fabrication of gyroscope, accelerometer, and support electronics subassembly 12. Typical examples of such electronic components include protective devices that counteract any electrostatic voltages that may become present on the individual connector contacts, logic for allocating A/D converter 68 among the three gyroscopes 60 and accelerometers 62, support components for processing device 70, and the like.

Figure 5:
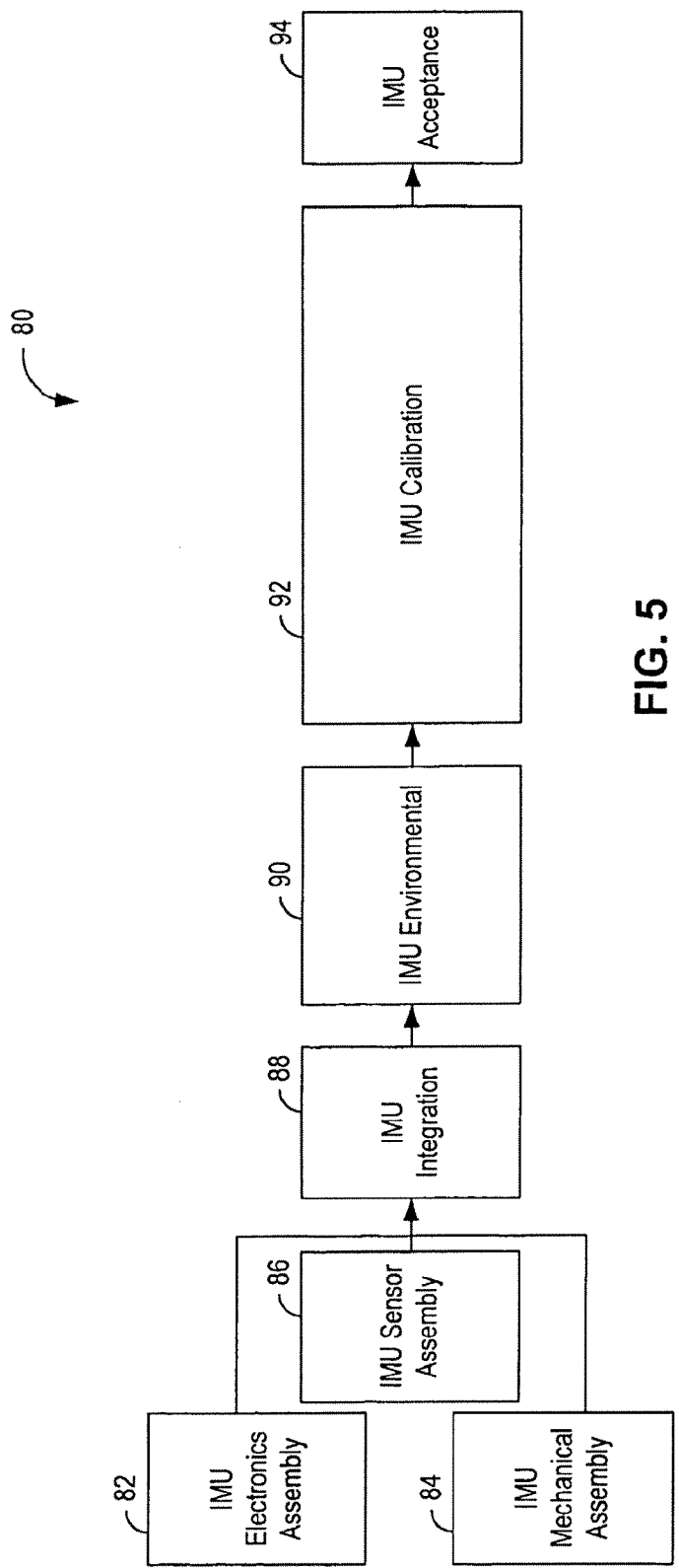
FIG. 5 is a flow diagram illustrating build and rework processes associated with the IMU of FIG. 1.

FIG. 5 is a flow diagram 80 illustrating build and rework processes associated with IMU 10. Processes include an electronics assembly process 82, a mechanical assembly process 84, and a sensor assembly process 86. An IMU integration process 88 is indicative of the fabrication of the IMU 10, and specifically, fabrication of gyroscope, accelerometer, and support electronics subassembly 12 and power supply subassembly 14 based on the electronics assembly process 82, the mechanical assembly process 84, and the sensor assembly process 86. IMU integration process 88 is further indicative of the fabrication of the IMU 10 from the completed gyroscope, accelerometer, and support electronics subassembly 12 and power supply subassembly 14. An IMU environmental process 90 is performed to ensure that the completed IMU 10 is able to withstand the rigorous environment to which it will be exposed during its operation.

An IMU calibration process 92 is performed to characterize the gyroscopes 60 and accelerometers 62, such that the data contained within the outputs received from gyroscope, accelerometer, and support electronics subassembly 12 are as expected. As is known, there are variations between individual gyroscopes 60 and accelerometers 62 due to their mechanical nature, and as represented by the flow diagram 80 of FIG. 5, the IMU calibration process 92 is the most time consuming of all the processes utilized to build and/or rework an IMU 10. Upon completion of the IMU calibration process 92, the IMU 10 is accepted for use within a vehicle or other application through an IMU acceptance process 94.

There are problems associated with the rework and repair processes associated with IMU 10. Specifically, when there is a failure in the supporting electronics, the gyroscopes 60 and accelerometers 62, collectively referred to as sensor devices, may be disturbed during the removal and replacement process of the failed electronic component(s). Such a disturbance often results in the need to recalibrate the IMU 10. As illustrated in FIG. 5, the IMU calibration process 92 is the most time consuming, and likely most expensive, especially when associated with rework of an IMU 10.

Figure 6:
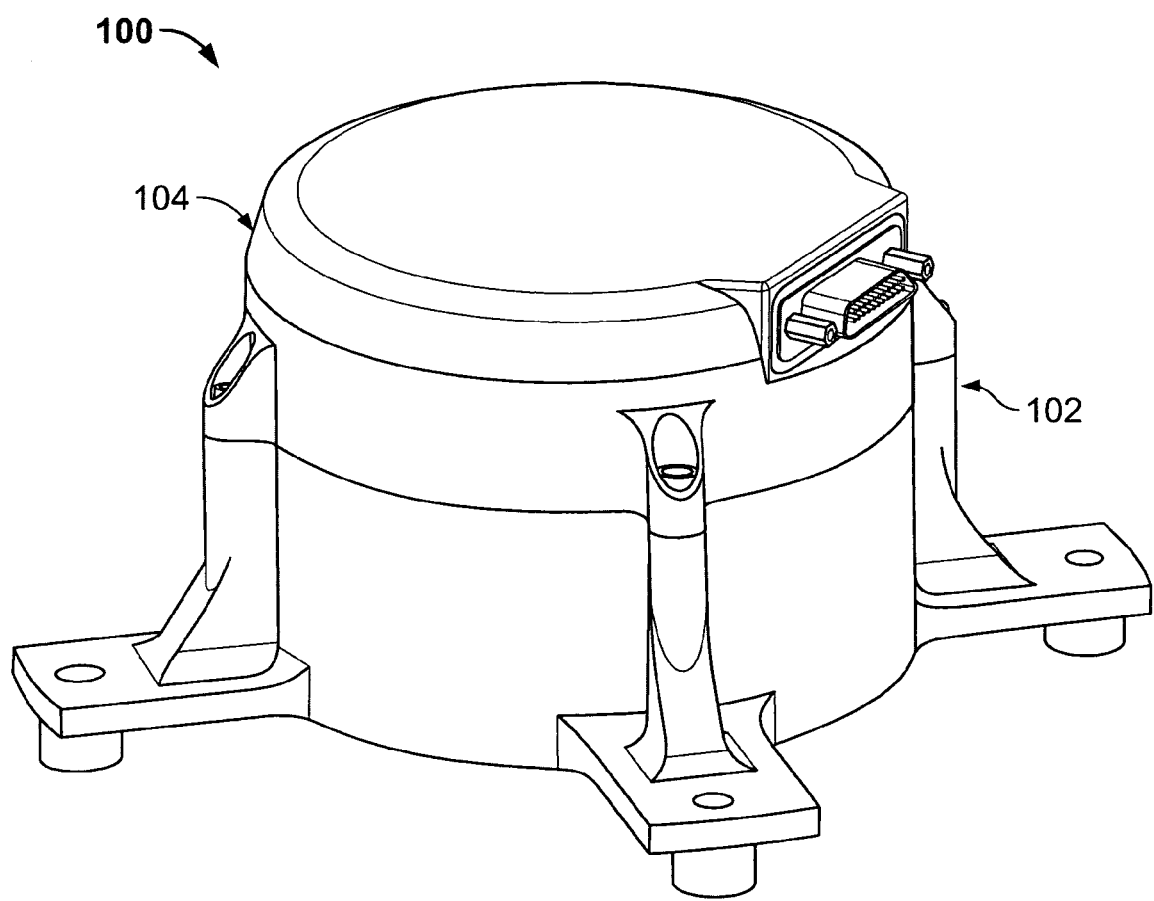
FIG. 6 is an illustration of an assembled IMU having segregated sensor and support electronics subassemblies.

FIG. 6 is an illustration of an assembled IMU 100 having segregated sensor and support electronics subassemblies. Specifically, and as described in further detail below, IMU 100 includes a gyroscope and accelerometer subassembly 102 and a support electronics subassembly 104. As also further described below, the segregation of components and packaging may allow, at least for a portion of reworked IMUs 100, that calibration processes, for example, similar to the above described IMU calibration process, need not be repeated for certain repairs and rework of IMUs 100

Figure 7:
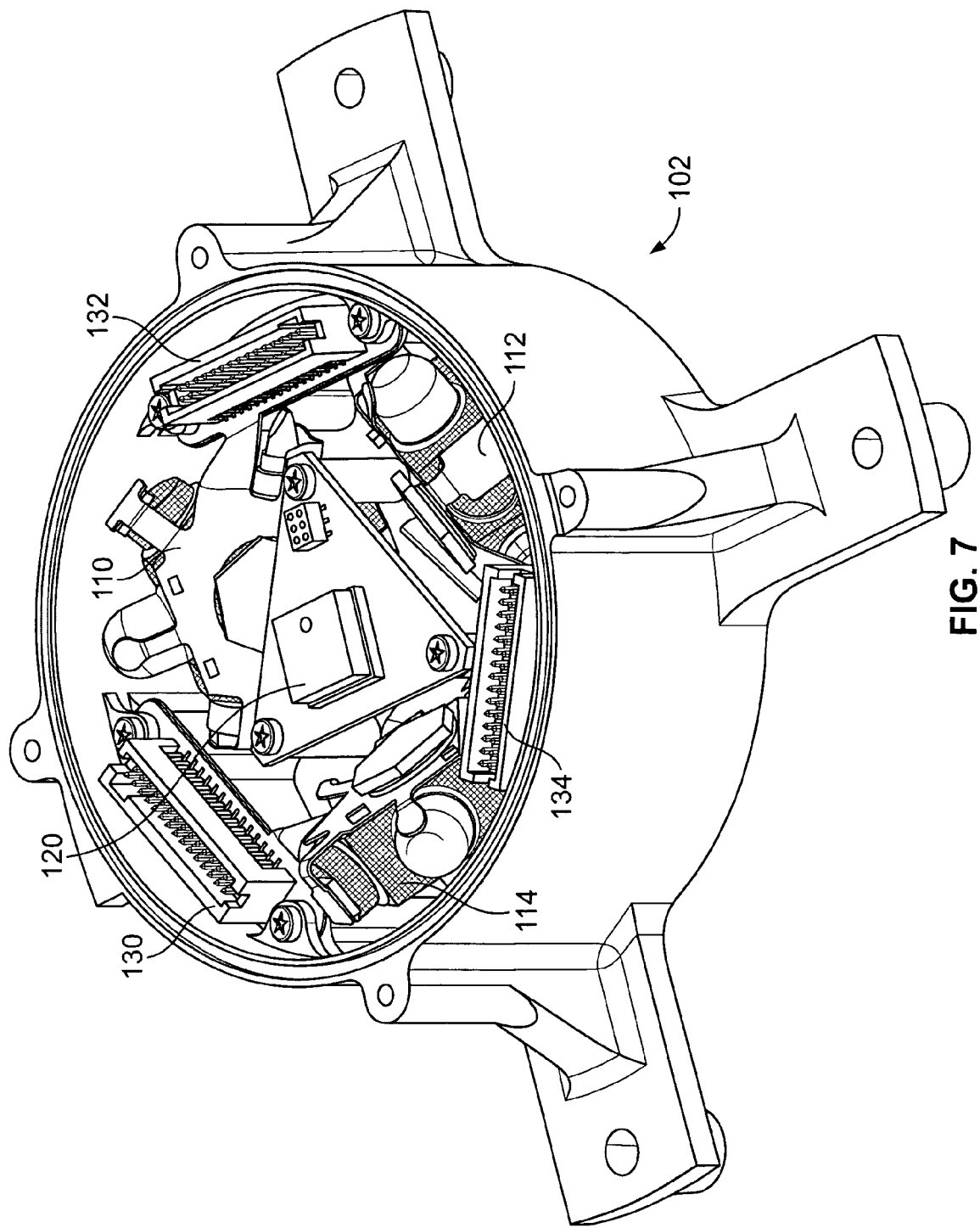
FIG. 7 is an illustration of a gyroscope and accelerometer subassembly of the IMU of FIG. 6.

FIG. 7 is an illustration of a gyroscope and accelerometer subassembly 102 of IMU 100. Gyroscope and accelerometer subassembly 102 includes three gyroscopes 110, 112, and 114, as well as three accelerometers 120, which are housed within a single package. A plurality of connectors 130, 132, and 134 are utilized to provide power to gyroscopes 110, 112, and 114 and accelerometers 120. Connectors 130, 132, and 134 are further configured to conduct the signals originating from gyroscopes 110, 112, and 114, and accelerometers 120 for further processing before being output from IMU 100 as further described below.

Figure 8:
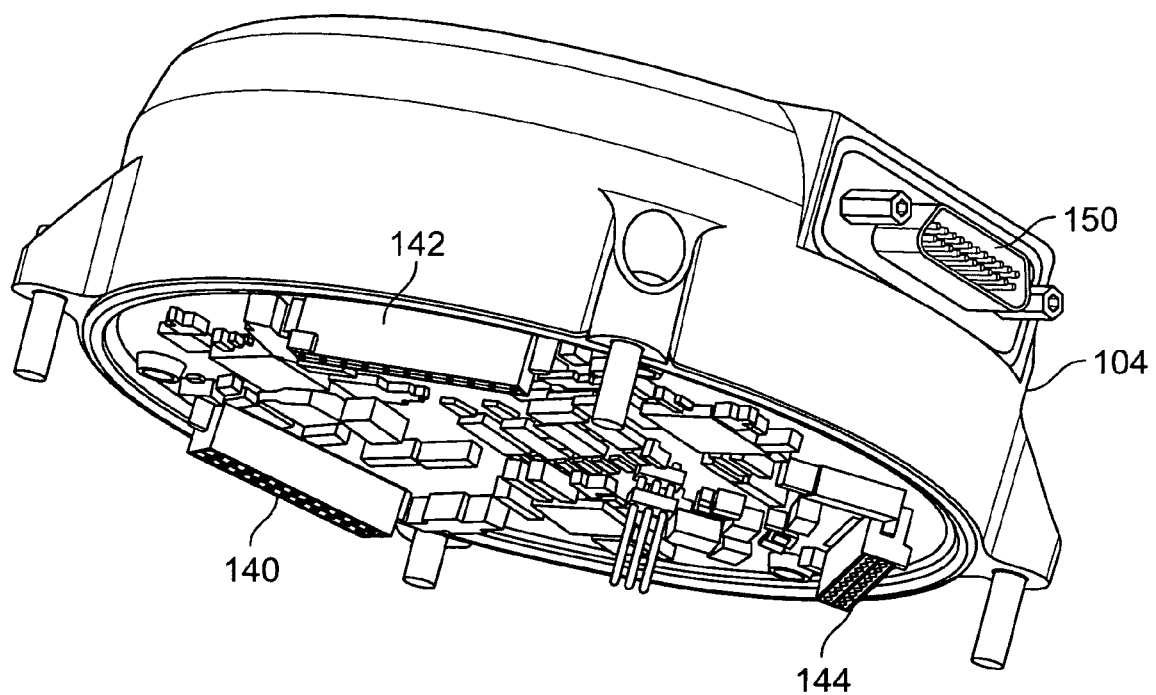
FIG. 8 is an illustration of a support electronics subassembly of the IMU of FIG. 6.

FIG. 8 is an illustration of support electronics subassembly 104 of IMU 100. As seen in the Figure, support electronics subassembly 104 includes three connectors 140, 142, and 144 which are configured to mate with connectors 130, 132, and 134 (shown in FIG. 7) effectively interconnecting gyroscopes 110, 112, and 114, and accelerometers 120 with their support electronics, which is described below with respect to FIG. 9.

Figure 9:
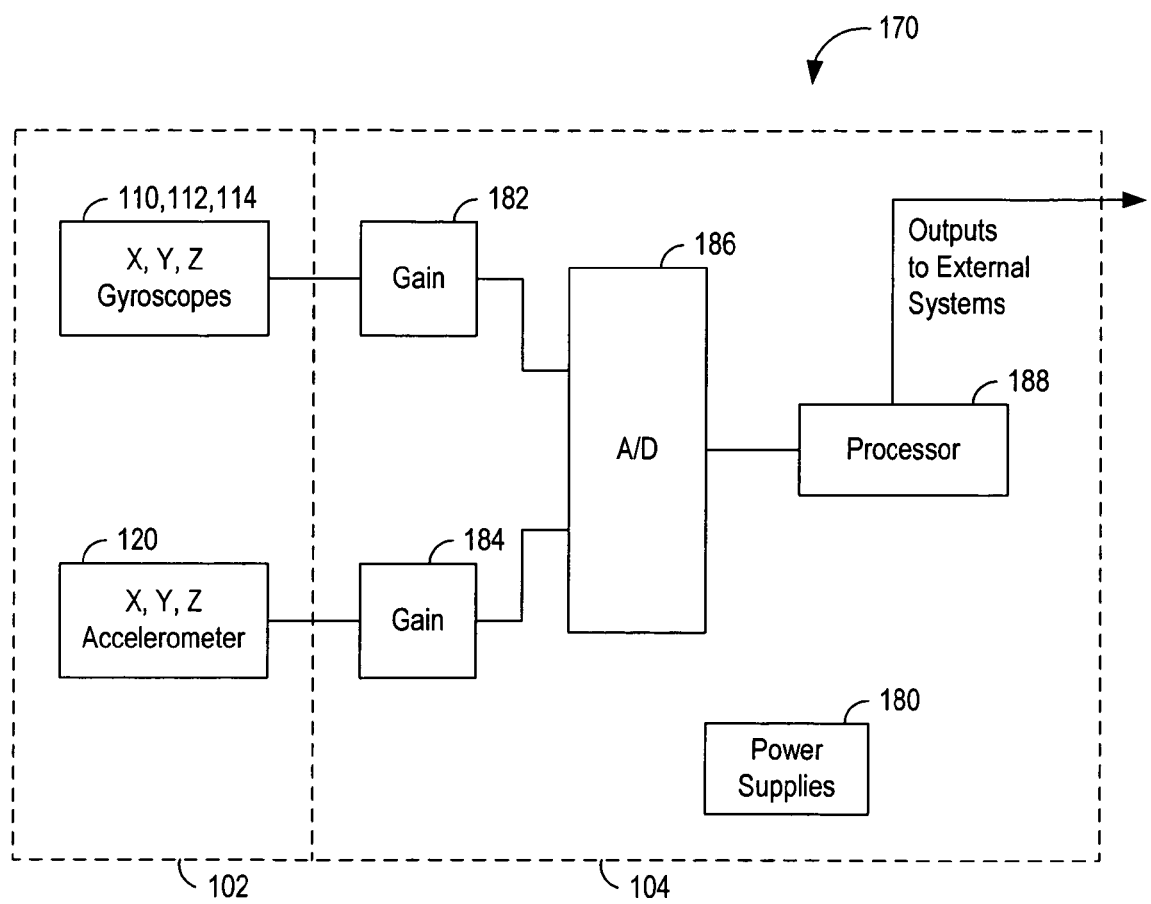
FIG. 9 is a block diagram of the IMU of FIG. 6, depicting boundaries between the subassemblies of FIGS. 7 and 8.

FIG. 9 is a block diagram 170 of the IMU of FIG. 6, depicting boundaries between the subassemblies 102 and 104 which are respectively shown in FIGS. 7 and 8. More specifically, block diagram 170 illustrates functional boundaries between gyroscope and accelerometer subassembly 102 and support electronics subassembly 104.

Support electronics subassembly 104 includes a power supply 180 which receives power from an external source and converts the received power to levels needed for operation of the various components of gyroscope and accelerometer subassembly 102 and support electronics subassembly 104.

Support electronics subassembly 104 further includes gain components 182 and 184 that receive and amplify outputs from gyroscopes 110, 112, and 114 and accelerometers 120. Outputs of gain components 182 and 184 are then input into A/D converter 186. An output of A/D converter 186 is then provided to a processing device 188, which is programmed to output data to external systems that is representative of the inertial conditions experienced by gyroscopes 110, 112, and 114 and accelerometers 120.

Gyroscope and accelerometer subassembly 102 as described herein includes three gyroscopes 110, 112, and 114, associated with the three axes, X, Y, and Z, and three accelerometers 120, also associated with the three axes. Output from these sensor devices are respectively input into gain components 182 and 184 (e.g., amplifiers), respectively, as described above.

While support electronics subassembly 104 is illustrated as having power supply 180, gain components 182 and 184, A/D converter 186, and processing device 188, those skilled in the art will realize that many additional electronic components are utilized within support electronics subassembly 104, and that each of the above listed components is fabricated using a number of distinct electronic components. Typical examples of such additional electronic components are described hereinabove, and such examples should not be construed as limiting.

Figure 10:
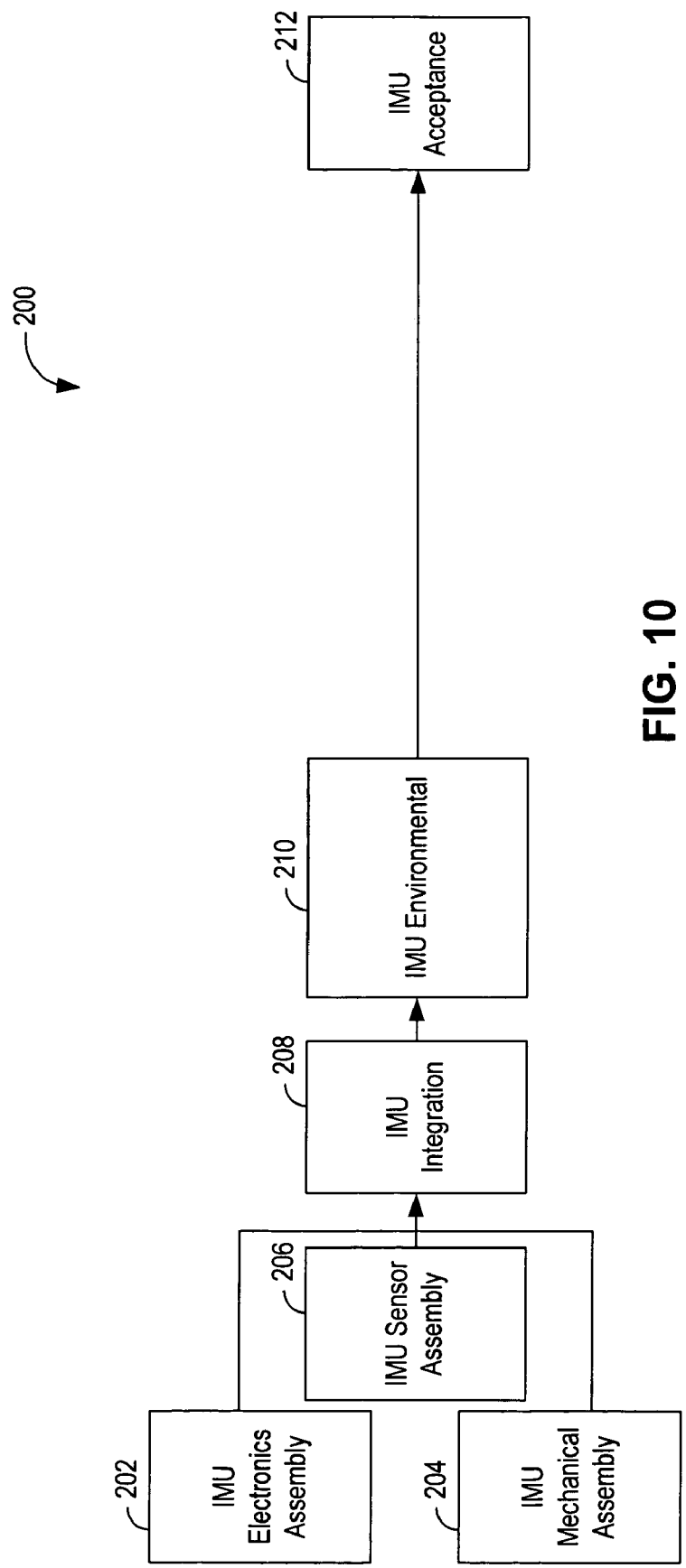
FIG. 10 is a flow diagram illustrating build and rework processes associated with the IMU of FIG. 6.

FIG. 10 is a flow diagram 200 illustrating improved rework processes that are associated with IMU 100 of FIGS. 6-9. Specifically, the processes include an electronics assembly process 202, a mechanical assembly process 204, and a sensor assembly process 206. An IMU integration process 208 is indicative of the fabrication of the IMU 100, and specifically, fabrication of gyroscope and accelerometer subassembly 102 and support electronics subassembly 104 based on the electronics assembly process 202, the mechanical assembly process 204, and the sensor assembly process 206. IMU integration process 208 is further indicative of the fabrication of the IMU 100 from the completed gyroscope and accelerometer subassembly 102, and support electronics subassembly 104. An IMU environmental process 210 is performed to ensure that the completed IMU 100 is able to withstand the rigorous environment to which it will be exposed during its operation. Finally, upon completion of the IMU environmental process 210, the IMU 100 is accepted for use within a vehicle or other application through an IMU acceptance process 212.

Contrasted to IMU 10 described above, there is no time consuming and expensive IMU calibration process as there is with IMU 10. As the gyroscopes and accelerometers are separate from the support electronics, there is no disturbance of these devices as a support electronics subassembly 104 is removed and/or replaced during a repair.

As explained by the descriptions of the above described embodiments, providing an IMU with segregated housing portions for sensors and support electronics, such as IMU 100, eliminates or reduces the amount of time for sensor calibration, at least as compared to known IMUs, after a repair or removal process. As the housing portions are segregated, repair and replacement of the support electronics subassemblies to not affect orientations or calibrations of the gyroscopes and accelerometers in the other subassembly. As described above, IMUs that have commingled sensors and support electronics are more likely to have to calibrate their sensors after a repair or replacement of a portion of the support electronics.

While the invention has been described in terms of various specific embodiments, those skilled in the art will recognize that the invention can be practiced with modification within the spirit and scope of the claims.

What is claimed is:

1. A method for rebuilding an inertial measurement unit, said method comprising:
    selecting a first subassembly having one or more inertial sensors mounted therein, the first subassembly having a first set of connectors, the one or more inertial sensors having previously calibrated settings;
    selecting a second subassembly having support electronics for processing signals originating from the one or more inertial sensors, the second subassembly having a second set of connectors configured to complementarily engage the first set of connectors;
    electronically de-coupling the first subassembly from the second subassembly by disengaging the first and second sets of connectors; and
    maintaining a position of the one or more inertial sensors with respect to the first subassembly, while disengaging the first and second sets of connectors.

2. The method according to claim 1, further comprising:
    interconnecting the first subassembly and the second subassembly by re-attaching the first and second subassemblies together.

3. The method according to claim 1 wherein selecting the first subassembly having one or more inertial sensors mounted therein includes having at least one gyroscope mounted in the first subassembly.

4. The method according to claim 1 wherein selecting the first subassembly having one or more inertial sensors mounted therein includes having at least one accelerometer mounted in the first subassembly.

* * * * *